No. 719,061. PATENTED JAN. 27, 1903.
J. A. TRAUT.
LEVELING INSTRUMENT.
APPLICATION FILED APR. 29, 1902.
NO MODEL.

Witnesses:
Robert Head
Edward E. Ellis

Inventor:
Justus A. Traut,
By his Attorney,
F. H. Richards

UNITED STATES PATENT OFFICE.

JUSTUS A. TRAUT, OF NEW BRITAIN, CONNECTICUT.

LEVELING INSTRUMENT.

SPECIFICATION forming part of Letters Patent No. 719,061, dated January 27, 1903.

Application filed April 29, 1902. Serial No. 105,147. (No model.)

*To all whom it may concern:*

Be it known that I, JUSTUS A. TRAUT, a citizen of the United States, residing in New Britain, in the county of Hartford and State of Connecticut, have invented certain new and useful Improvements in Leveling Instruments, of which the following is a specification.

This invention relates to leveling instruments; and it consists, substantially, in the improvements hereinafter particularly described.

The invention has reference more especially to that class of leveling instruments including both a spirit-level and a plumb; and the principal objects of the invention are to provide a level device and a plumb device combined with an indicator or index-lever in the production of a unitary structure adapted for attachment to a level-stock, and also to provide means for readily ascertaining or determining the inclination or pitch of surfaces from both horizontals and perpendiculars.

A further object of the invention is to provide an instrument of the character referred to with a level device and a plumb device and a single indicator mechanism common to both of said devices, and also to provide independent means of adjustment for the vial case or tube of each of said devices.

A further object is to provide a single axis or center of motion for both the level device and the plumb device and to provide an instrument of the kind referred to possessing simplicity of construction and organization of its several parts or elements and one also having many advantages in the uses thereof.

The above and additional objects are attained by means substantially such as are indicated in the accompanying drawings, in which—

Figure 1:
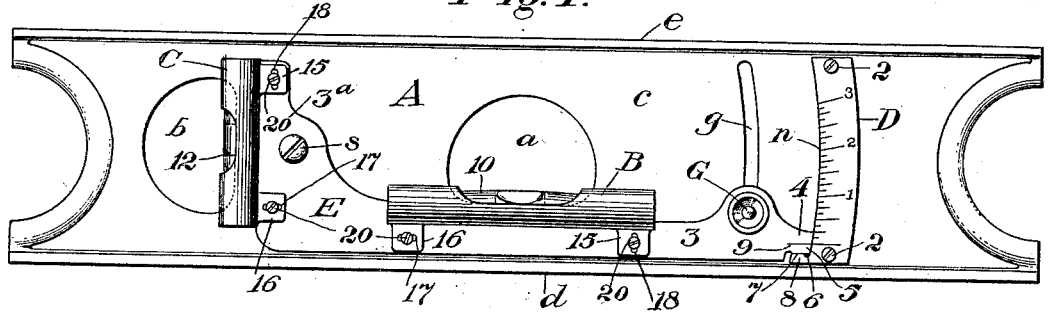
Figures 2, 3:
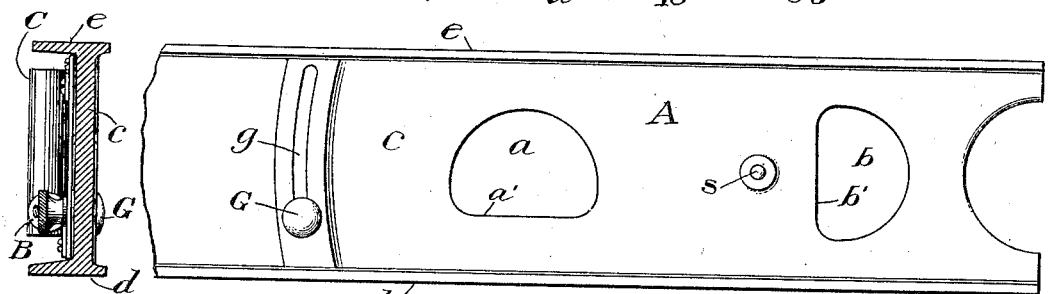
Figure 4:
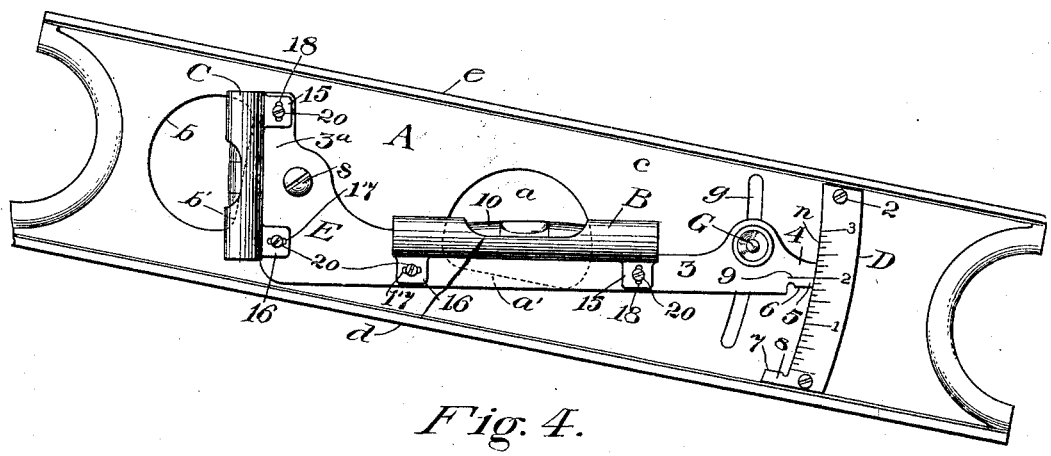

Figure 1 is a side view of a combination level and plumb instrument embodying the several features of my improvement; and Fig. 2 is a similar view taken from the opposite side thereof, the instrument being broken off at one end. Fig. 3 is a transverse sectional view; and Fig. 4 is a view of the instrument, taken from the same side as in Fig. 1, showing the stock at an inclination or pitch from a horizontal and the level device adjusted to indicate the degree of such inclination or pitch.

Before proceeding with a more detailed description it may be stated that I employ a suitable stock for the instrument, formed with openings adjacent to which the level and plumb devices are located so as to be seen or observed from either side of the stock. The stock is preferably of metal and is formed with comparatively broad flanges, which are planed off evenly to constitute the working faces of the instrument, and at the ends thereof the said stock is recessed, the edges of the recesses being flanged by which to give increased strength to the thinner or web portion, which constitutes the body of the stock. In addition to possessing the capacity of ascertaining or determining the pitch of surfaces from horizontals and perpendiculars my improved instrument may also be employed for all the purposes for which ordinary spirit-levels and plumbs are used by bricklayers, masons, and other artisans.

The level and plumb devices of my improved instrument are mounted upon or supported by an indicator or index-lever common to both of said devices one arm of said lever having a suitable index thereon registering with the divisions of a scale secured to the stock of the instrument and also common to both of said devices. The main adjustments of the said devices are effected on a common axis or center of motion, the said level device being preferably supported by the longer arm of the indicator or index-lever, while the said plumb device is supported by the shorter arm of said lever at permanent right angles to the level device, it being evident, of course, that the reverse of this organization may be resorted to if desired. The level device is supported at a greater distance from the fulcrum of the indicator or index-lever than is the plumb device, the weight of said first-named device, combined with the extra weight of the longer arm of the lever, tending to maintain said lever in a position normally to indicate zero of the scale, the said level and plumb devices being in corresponding positions, of course, this being a specially advantageous feature in an instrument of this kind. I thus obtain a complete assemblage or organization of the principal operative elements of the instrument in a single or unitary structure, capable of being sold to the trade as a new article of manufacture, adapted for use upon many of the ordinary level-stocks now in use, with little or no alternation of the construction of the stock.

Preferably I employ suitable means for fastening or securing the indicator or index-lever both at the zero-point of the scale as well as at the different positions to which it may be carried with reference to such scale in the adjustments of either the level device or plumb device for determining inclination or pitch of surfaces from true horizontals or perpendiculars. I also preferably employ independent adjustable means for mounting the said level and plumb devices upon the arms of the said indicator or index-lever, all as will hereinafter more fully appear.

Specific reference being had to the accompanying drawings by the designating characters marked thereon, A represents the stock of my improved instrument, the same being preferably constructed of metal and formed with an opening $a$ at the approximate central point thereof and a similar opening $b$ at near one end, said stock having a body $c$, consisting of a relatively thin web and comparatively broad side flanges $d$ and $e$, constituting the working faces of the implement. The openings referred to are formed, respectively, with straight-edge portions $a'$ and $b'$, which may be said to constitute the bases of the openings, said bases being parallel with the longer and shorter sides of the stock and at right angles to each other. Said openings enable the level device B and plumb device C to be readily viewed or observed from the opposite side of the stock to that on which the said devices are located, and to one side of preferably the central opening the stock is formed with a curved slot $g$, the sides of which are at an angle to the said flanges or working faces $d$ and $e$, as shown on the drawings. Secured at 2 2 to the said body or web $c$ of the stock, alongside the slot therein, is a scale-plate D, the inner edge $n$ of which is slightly curved in correspondence with the curved edges or sides of said slot, the said scale-plate D having proper lines of division and subdivision, as shown. I may construct and assemble the said level and plumb devices in any suitable way to bring them to the proper positions with reference to the said openings $a$ and $b$ of the stock and also by which they may be moved or adjusted in the ascertaining of inclination or pitch from horizontals and perpendiculars; but preferably I employ the embodiment about to be specifically referred to and which includes an axis or center of motion common to both of the devices B and C, as already mentioned, as well as a single indicator or index-lever for both of said devices, the parts all being constructed and united in a manner to give most accurate results in practice. Thus I preferably employ an indicator or index-lever E, fulcrumed at a suitable point—as, for instance, upon a pin or screw $s$ passing through an opening therefor in the stock about in line with the central point of the base of the opening $b$, the longer arm 3 of the lever being straight and extending parallel with the working face $d$ of the stock and the end or extremity 4 of said arm being notched to form a finger 5, the lower edge 6 of which is also parallel with said working face $d$ and adapted to engage the corresponding parallel edge 7 of a step 8, formed with and projecting inwardly from the lower part of the said scale-plate D, hereinbefore referred to. The said finger 5 of the said longer arm 3 of the lever E is provided with an index character or mark 9, which registers with the different divisions and subdivisions of the scale $n$, accordingly as either the said level device or the said plumb device is adjusted to different positions in the uses of the instrument. The shorter arm $3^a$ of the index-lever is also straight and at right angles to the working faces of the stock of the instrument, as shown. The level device B is formed with or attached to the said longer arm 3 of the said indicator or index-lever and comprises a case or tube containing the usual vial or bubble-glass 10, and the plumb device C is similarly constituted of a case or tube and contained vial or bubble-glass 12 and is formed with or attached to the said shorter arm $3^a$ of the lever. Preferably I make said devices B and C separate from the arms of the lever and mount them thereon in a manner to be independently adjustable to compensate for any accidental dislocation thereof in use or for inequalities in the instrument such as may result when the working face of the stock gets out of true, as sometimes happens after the instrument or stock leaves the factory. Thus I provide the case or tube of each of the devices mentioned with lugs or portions 15 16, one being formed with a horizontal slot 17 and the other with a vertical slot 18, a suitable fastening-screw 20 passing through each of said slots and entering suitable holes or openings (not shown) in the arms of the index-lever. The purpose of the horizontal slots in said lugs or portions is to enable compensation to be made for variations of the predetermined distance between the openings in the lever-arms at the time of fitting or applying the screws for mounting the level and plumb devices in position, while the vertical slots in the said lugs or portions permit of the independent adjustments of said devices for the purposes mentioned, all this being clearly apparent from the drawings.

In the working positions of the instrument the weight of the said level device B, combined with the weight of the longer arm 3 of index-lever E, overbalances the combined weight of the plumb device C and shorter arm $3^a$ of said lever, and thus the lever is normally carried to a position to cause the index character thereon to register zero of the scale, substantially as indicated at Fig. 1, the said devices B and C occupying corresponding positions. I provide suitable means for securing said lever at such point as well as at any point to which it may be carried in adjustments of the level and plumb devices, said means consisting in the present instance of a set-screw G, passing through an opening therefor in arm 3 of the index-lever, and said screw working in the curved slot in the level-stock and having a tightening-nut for fastening the said lever in place.

It will be observed that the index-lever E is constructed of comparatively thin metal, as is the scale-plate D, and that both of said elements are mounted in position directly against the adjacent surface of the body or web c of the stock of the instrument, the level device and the plumb device being mounted on the arms of said lever at the outer surface thereof, thus enabling ready adjustment of said devices, as is apparent. By thus organizing the parts referred to the index-lever is firmly braced by the said body or web of the stock and is not liable to be easily bent or distorted in the use of the instrument, and no special construction of the stock is necessary for the accommodation and mounting in position of the movable parts within the planes of the edges of the wider portions of the flanges d and e. Moreover, the said index-lever and scale-plate are in the same plane, the movements of the end of the finger 5 of the longer arm of the lever being effected along the inner curved edge of the plate, thus enabling the scale to always be easily read with greater accuracy, the liability to effacement of the scale-divisions by wear being considerably less than if the movements of the said finger 5 were effected along the face of the scale-plate, as is apparent. Being mounted well within the edges of the said wider portions of the flanges d and e of the stock, the several elements contributing to my improvements are in the handling of the instrument thoroughly protected from injury or breakage from contact with external objects, and it will be observed that I am enabled to employ a relatively thin level-stock, which effects a great saving of material, besides rendering the instrument light and easy of manufacture. Still further, in the embodiment of my invention herein shown the means for securing the index-lever E in different positions of adjustment are in no wise dependent upon any special construction of the scale-plate, such as is the case in some former constructions, the said lever in the present instance being secured in varying positions by means of a screw and nut, the former passing through a curved slot formed in the body or web of the level-stock itself, as shown, and the latter screwing up against the side of such body or web, the effect of which is to impart greater stability to the general structure.

From the foregoing it will be seen that I have provided a very simple and inexpensive instrument of its kind and one having a great many desirable features of construction and organization of operative elements, and it will be understood that variations may be made from the different details herein specified and shown and still be within the spirit and scope of my invention.

Having described my invention, I claim—

1. A leveling instrument comprising a stock of relatively thin material and having lateral flanges at the longer edges thereof, said stock being formed therethrough with a slot having curved sides, and provided with a scale-plate the inner edge of which is on an arc of a circle concentric with the arc of the circle about which the sides of the slot are struck, said plate being provided with graduations at said inner edge thereof, a movable index-lever of substantially equal thickness with the scale-plate working directly against one side of the stock and formed at the end of one of the arms thereof with a finger working along the inner edge of said plate in the adjustments of the lever, said lever being fulcrumed at the center of the circles in which the said mentioned arcs are included, a level device and a plumb device supported by the lever-arms, and means carried by one of the latter and working in said slot for securing the lever in different positions.

2. A leveling instrument comprising a stock of relatively thin material and having lateral flanges at the longer edges thereof, said stock being formed therethrough with a slot having curved sides, and provided with a scale-plate the inner edge of which is on an arc of a circle concentric with the arc of the circle about which the sides of the slot are struck, said plate being provided with graduations at said inner edge thereof, a movable index-lever of substantially equal thickness with the scale-plate working directly against one side of the stock and formed at the end of one of the arms thereof with a finger working along the inner edge of said plate in the adjustments of the lever, said lever being fulcrumed at the center of the circles in which the said mentioned arcs are included, a level device and a plumb device supported by the lever-arms, a screw carried by one of the latter and working in said slot, and a nut on said screw for securing the lever in different positions.

3. A leveling instrument comprising a stock of relatively thin material and having lateral flanges at the longer edges thereof, said stock being formed therethrough with a slot having curved sides, and provided with a scale-plate the inner edge of which is on an arc of a circle concentric with the arc of the circle about which the sides of the slot are struck, said plate being provided with graduations at said inner edge thereof, a movable index-lever of substantially equal thickness with the scale-plate working directly against one side of the stock and formed at the end of the longer arm thereof with a finger working along the inner edge of said plate in the adjustments of the lever, said lever being fulcrumed at the center of the circles in which said mentioned arcs are included, a level device and a plumb device supported by the lever-arms, and means for the independent adjustments of said devices, a screw carried by one of the lever-arms and working in said slot, and a nut on said screw for securing the lever in different positions.

4. A leveling instrument comprising a stock of relatively thin material and having lateral flanges at the longer edges thereof, said stock being formed therethrough with a slot having curved sides, and provided with a scale-plate the inner edge of which is on an arc of a circle concentric with the arc of the circle about which the sides of the slot are struck, said plate being provided with graduations at said inner edge thereof, a movable index-lever of substantially equal thickness with the scale-plate working directly against one side of the stock and formed at the end of the longer arm thereof with a finger working along the inner edge of the plate in the adjustments of the lever, said lever being fulcrumed at the center of the circles in which said mentioned arcs are included, a level device and a plumb device supported by the lever-arms, each being provided with lugs having one a vertical slot and the other a horizontal slot, with screws entering the lever-arms through these slots, and means carried on said longer lever-arm and working in the curved slot of the stock for securing the lever in different positions.

5. A leveling instrument comprising a stock of relatively thin material and having lateral flanges at the longer edges thereof, said stock being formed therethrough with a slot having curved sides, and provided with a scale-plate the inner edge of which is on an arc of a circle concentric with the arc of the circle about which the sides of the slot are struck, said plate being provided with graduations at said inner edge thereof and formed at its lower end with an inwardly-projecting step, a movable index-lever of substantially equal thickness with the scale-plate working directly against one side of the stock, and formed at the end of one arm thereof with a finger adapted to rest on said step and working along the inner edge of said plate in the adjustments of the lever, said lever being fulcrumed at the center of the circles in which the said mentioned arcs are included, a level device and a plumb device supported by the lever-arms, and means carried by one of the latter and working in said slot for securing the lever in different positions.

6. A leveling device comprising a stock of relatively thin material and having lateral flanges at the longer edges thereof, said stock being formed therethrough with a slot having curved sides, and provided with a scale-plate the inner edge of which is on an arc of a circle concentric with the arc of the circle about which the sides of the slot are struck, said plate being provided with graduations at said inner edge thereof and formed at its lower end with an inwardly-projecting step, a movable index-lever of substantially equal thickness with the scale-plate working directly against one side of the stock, and formed at the end of the longer arm thereof with a finger adapted to rest on said step and working along the inner edge of said plate in the adjustments of the lever, said lever being fulcrumed at the center of the circles in which the said mentioned arcs are included, a level device and a plumb device supported by the lever-arms, each being provided with lugs having one a vertical slot and the other a horizontal slot, with screws entering the lever-arms through these slots, a screw carried by the longer one of said arms and working in the curved slot of the stock, and a nut on the screw for securing the lever in different positions.

7. A leveling instrument comprising a stock of relatively thin material formed with openings therein and having lateral flanges at the longer edges thereof, said stock being formed also with a curved transverse slot having curved sides, and provided with a scale-plate the inner edge of which is on an arc of a circle concentric with the arc of the circle about which the sides of the slot are struck, said plate being provided with graduations at said inner edge thereof, a movable index-lever of substantially equal thickness with the scale-plate working directly against one side of the stock and formed at the end of the longer arm thereof with a finger working along the inner edge of the plate in the adjustments of the lever, said lever being fulcrumed at the center of the circles in which the said arcs are included, a level device and a plumb device supported by the lever-arms in position before the openings in the stock, and means carried by said longer lever-arm and working in said curved slot for securing the lever in different positions.

8. A leveling instrument comprising a stock formed therethrough with a slot having curved sides and provided with a scale-plate the inner edge of which is on an arc of a circle concentric with the arc of the circle about which the sides of the slot are struck, said scale-plate having graduations at the said inner edge thereof, a movable lever working directly against one side of the stock with the end of one arm thereof movable along the inner edge of the scale-plate in the adjustments of the lever, said lever being fulcrumed at the center of the circles in which the said mentioned arcs are included, a level device and a plumb device supported at the outer side of the lever-arms, each being provided with lugs having one a vertical slot and the other a horizontal slot, with screws entering the lever-arms through these slots, and means carried by one of said arms and working in the slot for securing the lever in different positions of adjustment.

9. A leveling instrument comprising a stock formed therethrough with a slot having curved sides and provided with a scale-plate the inner edge of which is on an arc of a circle concentric with the arc of the circle about which the sides of the slot are struck, said scale-plate having graduations at the said inner edge thereof, a movable lever working directly against one side of the stock with the end of one arm thereof working along the inner edge of the scale-plate in the adjustments of the lever, said lever being fulcrumed at the center of the circles in which the said mentioned arcs are included, a level device and a plumb device supported at the outer side of the lever-arms, and means carried by one of said arms and working in the slot for securing the lever in different positions.

JUSTUS A. TRAUT.

Witnesses:
EBEN STRONG,
FRANK L. TRAUT.